US011729338B2

(12) United States Patent
Okuno

(10) Patent No.: US 11,729,338 B2
(45) Date of Patent: Aug. 15, 2023

(54) IMAGE PROCESSING APPARATUS CONFIGURED TO PREFORM IMAGE PROCESSING BASED ON INSTRUCTION FROM TERMINAL AND IMAGE PROCESSING SYSTEM

(71) Applicant: BROTHER KOGYO KABUSHIKI KAISHA, Nagoya (JP)

(72) Inventor: Tetsuya Okuno, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 17/193,326

(22) Filed: Mar. 5, 2021

(65) Prior Publication Data
US 2021/0306522 A1    Sep. 30, 2021

(30) Foreign Application Priority Data
Mar. 31, 2020  (JP) ................................. 2020-062680

(51) Int. Cl.
*H04N 1/44*    (2006.01)
*H04N 1/00*    (2006.01)

(52) U.S. Cl.
CPC ....... *H04N 1/4426* (2013.01); *H04N 1/00244* (2013.01); *H04N 1/00384* (2013.01)

(58) Field of Classification Search
None
See application file for complete search history.

(56) References Cited

U.S. PATENT DOCUMENTS

| 2015/0082389 A1* | 3/2015 | Han | H04L 63/205 |
| | | | 726/4 |
| 2015/0169266 A1* | 6/2015 | Iwasaki | H04N 1/001 |
| | | | 358/1.14 |
| 2015/0277821 A1* | 10/2015 | Mori | G06F 3/1238 |
| | | | 358/1.15 |
| 2016/0154616 A1* | 6/2016 | Hirata | G06F 3/1222 |
| | | | 358/1.14 |
| 2016/0255243 A1* | 9/2016 | Omori | H04N 1/4426 |
| | | | 358/1.14 |
| 2017/0031638 A1* | 2/2017 | Kitagata | G06F 3/1206 |
| 2021/0176237 A1* | 6/2021 | Nishida | G06F 21/33 |

FOREIGN PATENT DOCUMENTS

| JP | 2002-132726 A | 5/2002 |
| JP | 2015-60244 A  | 3/2015 |
| JP | 2015-118533 A | 6/2015 |
| JP | 2018-14552 A  | 1/2018 |

\* cited by examiner

*Primary Examiner* — Miya J Williams
*Assistant Examiner* — Pawan Dhingra
(74) *Attorney, Agent, or Firm* — Scully, Scott, Murphy & Presser, PC

(57) ABSTRACT

According to aspects of the present disclosures, when receiving an enabling request of a cloud cooperation function, a controller of an MFP notifies a user using an LCD module and change its state to an approval waiting state. When an approval operation by a user is confirmed, the MFP shifts access permission state and notifies a mobile terminal of the fact. When a constant connection between the MFP and a server is established, the MFP transmits a creation request for creating a server access token to the server. Then, the MFP receives the server access toke and transmits the same to the mobile terminal.

12 Claims, 10 Drawing Sheets

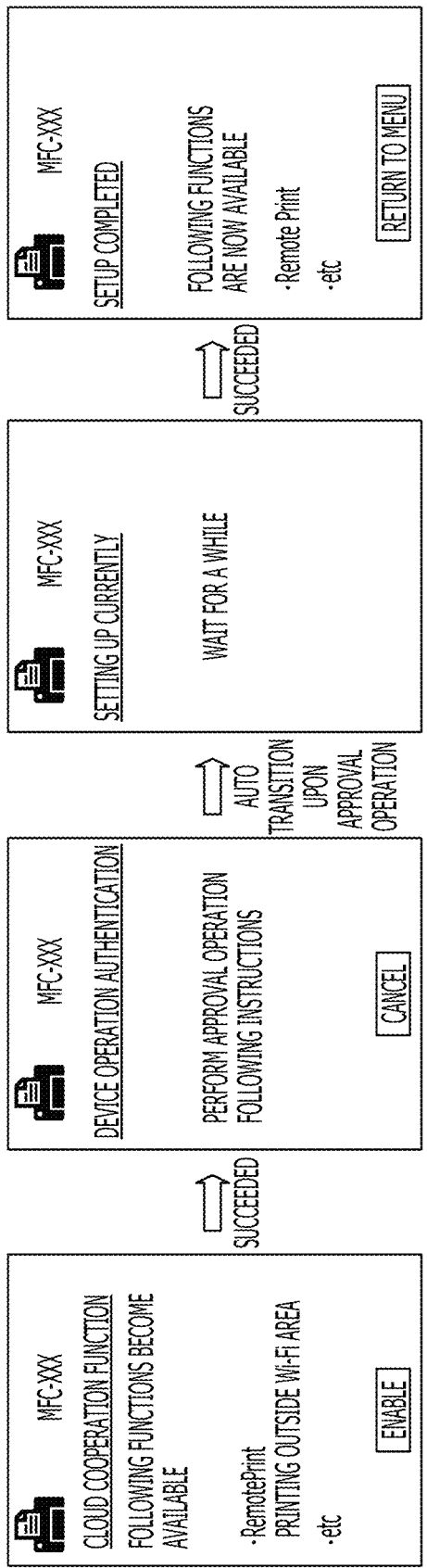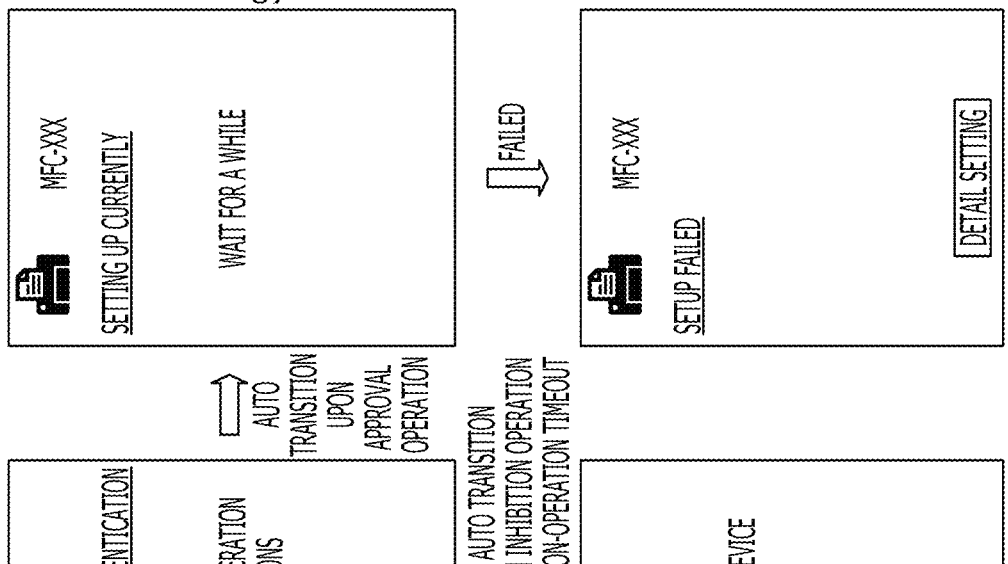

IMAGE PROCESSING APPARATUS CONFIGURED TO PREFORM IMAGE PROCESSING BASED ON INSTRUCTION FROM TERMINAL AND IMAGE PROCESSING SYSTEM

CROSS-REFERENCE TO RELATED APPLICATIONS

This application claims priority under 35 U.S.C. § 119 from Japanese Patent Application No. 2020-062680 filed on Mar. 31, 2020. The entire subject matter of the application is incorporated herein by reference.

BACKGROUND

Technical Field

The present disclosures relate to an image processing apparatus having a cloud cooperation function and an image processing system including the same.

Related Art

An imaging device such as an MFP that has a cloud cooperation function has been known. The cloud cooperation function enables a terminal not belonging to the same network as the MFP to perform operations related to the MFP via a server. By using this function, a user can have an MFP perform operations such as printing on printing sheets (remote printing) or scanning images by accessing a server from the terminal even in an environment where the terminal does not belong to the same network as the MFP.

SUMMARY

In order to enable the use of cloud cooperation in known technologies, the web page provided by the embedded web server (EWS) in the MFP is generally displayed on an external device, and a user must log in to the external device with an administrator ID and a password to configure various settings. Thus, in the current state of affairs, preparing (setting up) for using the cloud cooperation function requires a complicated operation, and is not very convenient for ordinary users. The same problem also occurs with a scanner equipped with a scanning device configured to scan images on a medium. Thus, it is a common issue for a device equipped with at least one of the recording device configured to record an image to a medium and the scanning device configured to scan an image on the medium (referred to herein as an image processing device) to improve the convenience of preparing to use the cloud cooperation function.

According to aspects of the present disclosure, there is provided an image processing apparatus, comprising, at least one of a recording device configured to record an image on a medium and a scanning device configured to scan an image on a medium, a communication device, a receiving device configured to receive an input according to a user operation, a notification device, and a controller. The controller is configured to perform an enabling request receiving process of receiving an enabling request, which is a request of enabling a terminal device to perform an operation related to the image processing apparatus to a server communicable with the image processing apparatus, from the terminal device via the communication device, a notification process of controlling the notification device to notify after the enabling request receiving process, a confirmation process of checking whether the receiving device receives an approval operation to approve the enabling request after the notification process, a token creation requesting process of transmitting a creation request of a server access token regarding the operation performed by the terminal device to the server via the communication device after it is confirmed in the confirmation process that the receiving device has received the approval operation, a server access token receiving process of receiving the server access token from the server via the communication device after performing the token creation requesting process, and a server access token transmitting process of transmitting the server access token to the terminal device via the communication device after performing the server access token receiving process.

According to aspects of the present disclosure, there is provided an image processing system including an image processing apparatus, a terminal device and a server. The image processing apparatus includes at least one of a recording device configured to record an image on a medium and a scanning device configured to scan an image on a medium, a communication device, a receiving device configured to receive an operation by a user, a notification device and a controller. The terminal device is configured to transmit an enabling request to enable the terminal device to perform an operation related to the image processing apparatus to the server communicable with the image processing apparatus. The controller is configured to perform an enabling request receiving process of receiving the enabling request via the communication device, a notification process of controlling the notification device to notify after the enabling request receiving process, a confirmation process of checking whether the receiving device receives an approval operation to approve the enabling request after the notification process, and a token creation requesting process of transmitting a creation request of a server access token regarding the operation performed by the terminal device to the server via the communication device after it is confirmed in the confirmation process that the receiving device has received the approval operation. The server is configured to create the server access token and transmits the created server access token to the image processing apparatus in response to receipt of the creation request of the server access token. The controller is further configured to perform a server access token receiving process of receiving the server access token from the server via the communication device after performing the token creation requesting process, and a server access token transmitting process of transmitting the server access token to the terminal device via the communication device after performing the server access token receiving process. The terminal device is configured to transmit the server access token and a command including the operation related to the image processing apparatus to the server after receiving the server access token from the image processing apparatus.

According to aspects of the present disclosure, there is provided an non-transitory computer-readable recording medium for an image processing apparatus, the image processing apparatus including at least one of a recording device configured to record an image on a medium and a scanning device configured to scan an image on a medium, a communication device, a receiving device configured to receive an input according to a user operation, a notification device, and a controller. The recording medium containing computer-executable instructions which cause, when executed by the controller, the image processing apparatus to perform an enabling request receiving process of receiving an enabling request, which is a request of enabling a terminal device to perform an operation related to the image processing apparatus to a server communicable with the image processing apparatus, from the terminal device via the communication device, a notification process of controlling the notification device to notify after the enabling request receiving process, a confirmation process of checking whether the receiving device receives an approval operation to approve the enabling request after the notification process, a token creation requesting process of transmitting a creation request of a server access token regarding the operation performed by the terminal device to the server via the communication device after it is confirmed in the confirmation process that the receiving device has received the approval operation, a server access token receiving process of receiving the server access token from the server via the communication device after performing the token creation requesting process, and a server access token transmitting process of transmitting the server access token to the terminal device via the communication device after performing the server access token receiving process.

BRIEF DESCRIPTION OF THE DRAWINGS

FIGS. 4A-4G are schematic diagrams showing a transition of screens displayed on an LCD of the mobile terminal during the setup of the cloud cooperation function.

DETAILED DESCRIPTION OF THE EMBODIMENTS

Overall Configuration

An MFP, which is an image processing device in accordance with one embodiment of aspects of the present disclosures, and an image processing system including the MFP will be described below with reference to the drawings.

Figure 1:
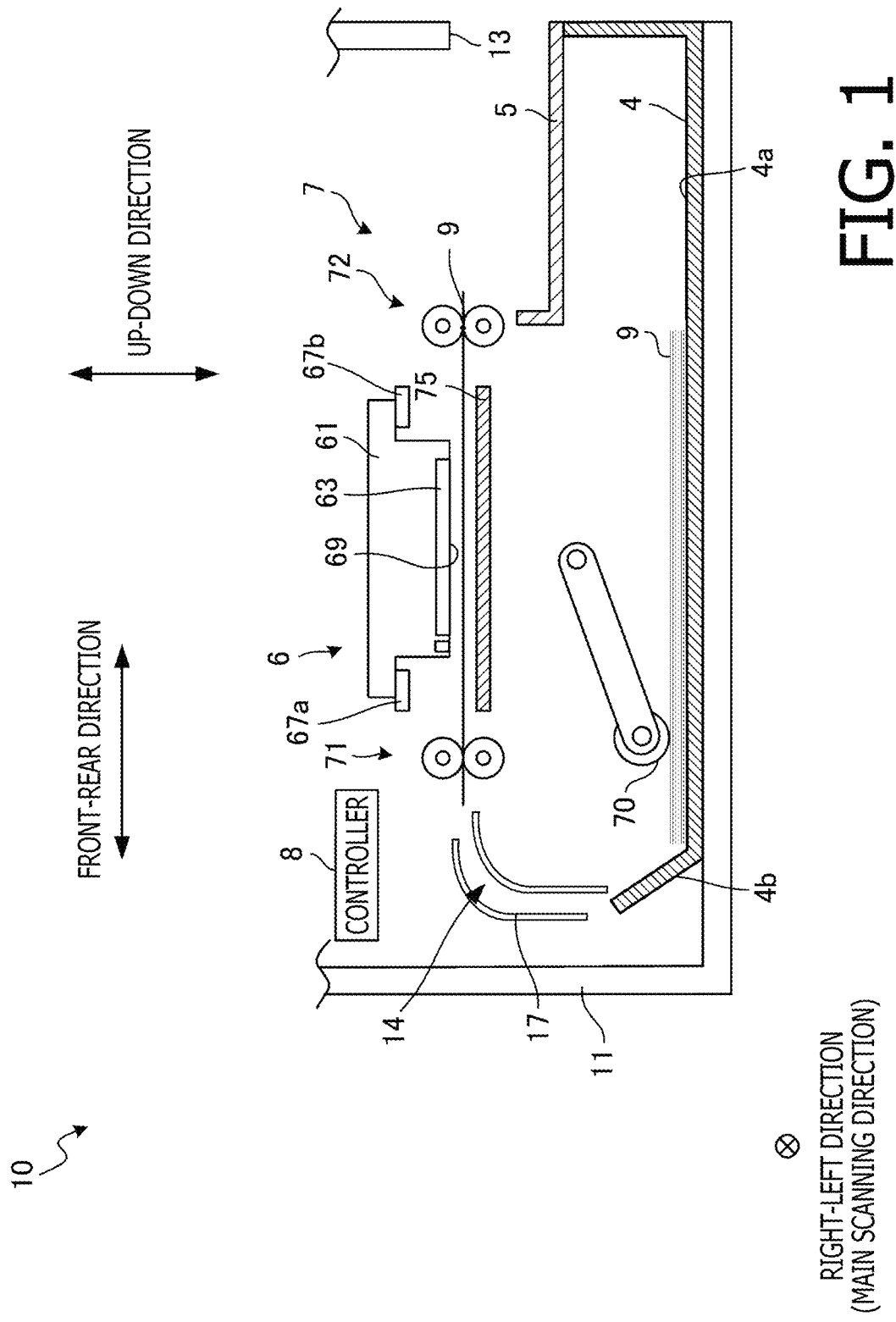
FIG. 1 is a schematic side view of an internal structure of an MFP as an image processing apparatus in accordance with one embodiment of the present invention.

FIG. 1 shows an internal configuration of an MFP 10. In the following description, up and down directions are defined based on a state in which the MFP 10 is set up for use (the state of FIG. 1), front and rear directions are defined with a side where an opening 13 of a housing 11 is provided defined as a front side, and right and left directions are defined when the MFP 10 viewed from the front side.

The MFP 10 has a sheet feed tray 4, a sheet discharge tray 5, a print module 6, a sheet conveyor 7, and a controller 8, as shown in FIG. 1. The sheet feed tray 4, the print module 6, the sheet conveyor 7, and a controller 8 are housed in a housing 11 of the MFP 10. The controller 8 is configured to control an entire operation of the MFP 10. In the housing 11, the sheet feed tray 4 is disposed below the print module 6. Although not shown in FIG. 1, the MFP 10 further has a scanning module 18 and an LCD module 19 (see FIG. 2) disposed in the housing 11.

The sheet feed tray 4 is configured to support and accommodate a plurality of sheets 9 in a stacked state. The sheet feed tray 4 can be inserted or withdrawn in a front-rear direction through an opening 13 formed on a front surface of the housing 11. A sheet discharge tray 5 is disposed above the front side of the sheet feed tray 4, and the sheet discharge tray 5 is configured to move together with the sheet feed tray 4. The sheet feed tray 4 has a support surface 4a configured to support the sheet 9. The support surface 4a is a surface perpendicular to the vertical direction. When the sheet feed tray 4 is positioned in the housing 11, the support surface 4a is exposed to an interior space of the housing 11. An inclined plate 4b is provided at a rear end of the sheet feed tray 4.

The print module 6 has a carriage 61 and a recording head 63. The carriage 61 is supported by two guide rails 67a and 67b. The two guide rails 67a and 67b are disposed apart from each other in the front-rear direction, each extending in the right-left direction. The carriage 61 is disposed over the two guide rails 67a, 67b. The carriage 61 is arranged so as to be movable reciprocally along the two guide rails 67a and 67b in the right-left direction, which is a main scanning direction, by the carriage drive motor 21 (see FIG. 2). The recording head 63 is mounted on the carriage 61. The recording head 63 is configured to discharge ink supplied from an ink cartridge (not shown) from a plurality of nozzles (not shown) formed on a nozzle surface 69, which is the lower surface of the recording head 63.

The sheet conveyor 7 conveys the sheet 9 inside the print module 6 and includes a sheet feed roller 70, a conveying roller pair 71, a discharge roller pair 72, a platen 75, and a guide member 17. The sheet feed roller 70 is rotated by imparting a driving force from the sheet feeding motor 22 (see FIG. 2) to feed the sheet 9, which is the topmost sheet among the sheets supported on the sheet feed tray 4, rearward.

The conveying roller pair 71 and the discharge roller pair 72 are disposed across the print module 6 in the front-rear direction, the conveying roller pair 71 being disposed on the rear side with respect to the print module 6, and the discharge roller pair 72 being disposed on the front side with respect to the print module 6. The platen 75 is disposed below the print module 6 so as to face the nozzle surface 69 of the print module 6. The conveyor roller pair 71 and the discharge roller pair 72 are driven to rotate by the imparting of a driving force from a conveying motor 23 (see FIG. 2).

The guide member 17 defines a conveying path 14 that guides the sheet 9 fed out of the sheet feed tray 4 into an area facing the nozzle surface 69 of the recording head 63. The guide member 17 extends from a position in the vicinity of the rear end of the sheet feed tray 4 to the vicinity of the conveying roller pair 71.

The sheet 9 fed rearwardly out of the sheet feed tray 4 by the sheet feeding roller 70 heads diagonally upward by the inclined plate 4b provided at the rear end of the sheet feed tray 4, and reaches a position where the sheet 9 is sandwiched between the conveying roller pair 71 through the conveying path 14 defined by the guide member 17. The sheet 9 sandwiched between the conveying roller pair 71 is carried by the conveying roller pair 71 to an area facing the nozzle surface 69 of the recording head 63. The sheet 9 carried by the conveying roller pair 71 is supported by the platen 75, and an image is recorded as ink droplets are ejected from the nozzle (not shown) of the recording head 63, which is moving in the main scanning direction. The sheet 9 on which the image is recorded is conveyed frontward by the ejection roller pair 72 and ejected into the sheet discharge tray 5.

Block Configuration

Figure 2:
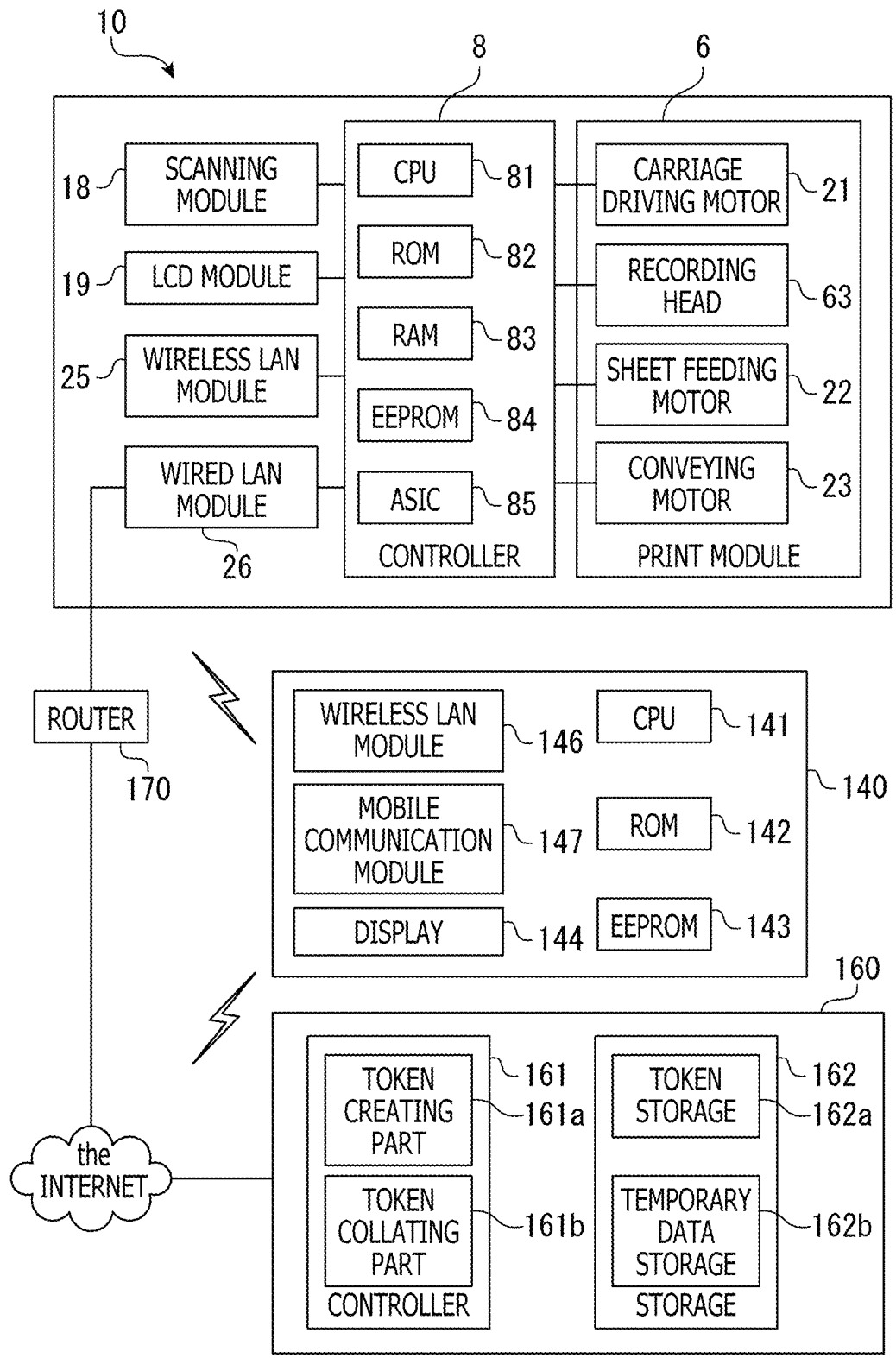
FIG. 2 is a block diagram showing a hardware configuration of the MFP shown in FIG. 1, a server and a mobile terminal.

Next, referring to FIG. 2, a block configuration of the image processing system including the MFP 10 according to the present embodiment will be described. As shown in FIG. 2, the image processing system includes the MFP 10, a mobile terminal 140, and a server 160. Although FIG. 2 depicts only one MFP 10 connected to a router 170, two or more of the MFP 10, the printer and the scanner may be connected to the router 170.

A carriage drive motor 21, the recording head 63, the sheet feeding motor 22, and the sheet conveying motor 23 of the MFP 10 are electrically connected to the controller 8 of the MFP 10. In addition, the scanning module 18, an LCD module 19, a wireless LAN module 25 and a wired LAN module 26 are electrically connected to the controller 8.

The scanning module 18 is a flatbed image scanner including a linear image sensor such as a CCD. The image sensor has a shape elongated in the main scanning direction, and configured to scan a document placed on a platen (not shown) while moving in a sub scanning direction and outputs image data. The LCD module 19 includes a display configured to display various pieces of information related to the MFP 10 in text and/or images. The display is of a touch screen type, and when the user touches the display, a position information of a touched position is output to the controller 8. That is, according to the present embodiment, the LCD module 19 serves as a receiving device that receives input from the user's operation and also as a notification device.

The wireless LAN module 25 performs a network communication with another wireless communication device (in this embodiment, with the mobile terminal 140) in compliance with a wireless LAN communication standard such as IEEE 802.11ac. The wired LAN module 26 has a LAN port, which is a LAN cable slot, and connects the MFP 10 to the Internet via the router 170. In this embodiment, it is assumed that the server 160 for the cloud cooperation function is connected to the Internet. The MFP 10 may be connected to the router 170 and the Internet via the wireless LAN module 25.

As shown in FIG. 2, the controller 8 includes the CPU 81, the ROM 82, the RAM 83, the EEPROM 84, and the ASIC 85, which operate together to control operations related to the cloud cooperation function. Further, the controller 8 controls the operation of each part of the print module 6, each part of the scanning module 18, the LCD module 19, the wireless LAN module 25 and the wired LAN module 26. In the present embodiment, a communication device is formed by both the wireless LAN module 25 and the wired LAN module 26.

The controller 8 performs an image recording operation to record the image represented by the image data on the sheet 9, a copy operation to records the image represented by the image data obtained by the scanning module 18 on the sheet 9, and a scanning operation to store the image data obtained by the scanning module 18 at a desired location in the RAM 83. In the image recording operation, the controller 8 controls the carriage drive motor 21 so that the carriage 61 moves reciprocally in the main scanning direction. The controller 8 controls the recording head 63 so that ink droplets are ejected from the nozzles (not shown) of the recording head 63 based on the image data stored in the RAM 83. Further, the controller 8 controls the sheet feeding motor 22 and the sheet conveying motor 23 so that the sheet 9 stored in the sheet feed tray 4 passes through a position facing the recording head 63 and is discharged onto the sheet discharge tray 5.

Although FIG. 2 illustrates one CPU 81 and one ASIC 85, the controller 8 may include only one CPU 81 which is configured to perform all the necessary processes. Alternatively, the controller 8 may include a plurality of CPUs 81 which are configured to perform the necessary processes in a shared manner. Further, the controller 8 may include only one ASIC 85 which may perform all the necessary processes. Alternatively, the controller 8 may include a plurality of ASICs 85 which may perform the necessary processes in a shared manner.

The mobile terminal 140 is, for example, a smartphone or tablet PC, and has a CPU 141, a ROM 142, and an EEPROM 143. In the EEPROM 143, an operating system (OS) that controls the operation of the mobile terminal 140, an MFP management program (hereinafter referred to as an "MFP management app" or simply "app") that controls the operation of the MFP 10, and the like are installed. The mobile terminal 140 has a touch-panel type display 144, which serves as an input/output device.

The mobile terminal 140 further has a wireless LAN module 146 and a mobile communication module 147. In this embodiment, the wireless LAN module 146 is directly and wirelessly connected to the wireless LAN module 25 of the MFP 10 (ad hoc mode) during the setup of the cloud cooperation function, which will be described below.

When the router 170 includes a wireless LAN module, the wireless LAN module 146 may be wirelessly connected to the MFP 10 via the router 170 (infrastructure mode). When performing an operation (e.g., to instruct remote printing) related to the MFP 10 using the cloud cooperation function, the mobile terminal 140 can communicate wirelessly with the server 160 via the wireless LAN module 146 or the mobile communication module 147. The mobile communication module 147 may be compliant with the fourth-generation mobile communication standard (4G), for example.

The server 160 includes a CPU, a ROM, a RAM and an HDD (Hard Disk Drive), etc. (not shown). In the HDD, an operating system that controls the operation of the server 160 and a management program relating to the cloud cooperation function of the MFP 10 are installed.

In the server 160, a controller 161 and a storage 162 are configured using a management program relating to the hardware and cloud cooperation functions described above. The controller 161 includes a token creator 161*a* and a token collator 161*b*. The storage 162 includes a token storage 162*a* and a temporary data storage 162*b*.

Setting Up of Cloud Cooperation Function

Next, the operation relating to the setup of the cloud cooperation function according to the present embodiment will be described with reference to FIGS. 3-7.

In the image processing system according to the present embodiment, the cloud cooperation function is not set up in an initial state. Therefore, it is necessary to set up the cloud cooperation function before the cloud cooperation function is used for the first time. There are two types of setups to set up the cloud cooperation function. One type of setup is to make the MFP 10 ready to connect to the server 160 (device setup). The other type of setup is to make the mobile terminal 140 ready to connect to the server 160 (terminal setup). After the device setup and the terminal setup are performed by one mobile terminal, the other mobile terminal does not need to perform the device setup for the MFP 10, and only needs to perform the terminal setup. As described above, at the time of setting up the cloud cooperation function, the mobile terminal 140 is wirelessly connected to the MFP 10 in the same network as the MFP 10 is connected.

First, the user launches the MFP management app on the mobile device 140, and then performs the prescribed operations on the app by tapping the display 144 to display a list of one or more devices (printer, scanner, MFP, etc.) on the same network and connected to the router 170 is displayed on the display 144. The user then selects the desired device to be targeted for the cloud cooperation function from among these devices by tapping the display 144 (AS1). The explanation will now proceed, assuming that the selected device is the MFP 10 of FIG. 1. Then, the mobile terminal 140 communicates with the selected MFP 10 based on the SNMP (Simple Network Management Protocol) to obtain capability and configuration information of the MFP 10 (BS1, CS1). The capability information includes information on whether or not the selected MFP supports the cloud cooperation function. The setting information includes various configurable items such as a sheet size, a record quality, and the like.

When the selected MFP supports the cloud cooperation function, the display 144 of the mobile terminal 140 displays the screen shown in FIG. 4A as a setting screen for the cloud cooperation function. This screen includes the model name of the selected MFP 10 (FIGS. 4B-4G also include the same), an indication of the cloud cooperation function and a list of functions that can be used with the cloud cooperation function, and an enabling button for the cloud cooperation function.

When the user taps the enabling button (AS2), the mobile terminal 140 transmits a request for creating a device access token (i.e., an enable request) to the MFP 10 (BS2), and the MFP receives the request for creating a device access token (an enabling request receiving process). This request for creating the device access token includes information indicating that the access type is the cloud cooperation function, and the access is based on the HTTPS protocol. At this time, if another user is using the MFP 10 (which is in operation, such as printing, by an order from another user, or is in a state other than the standby state in FIG. 5, which is described below), the mobile terminal 140 is notified of this fact, and the display 144 of the mobile terminal 140 shows information as shown in FIG. 4B on the display 144. This screen includes a text message stating that someone else is using it and that the setup has failed, and a return button.

Figure 5:
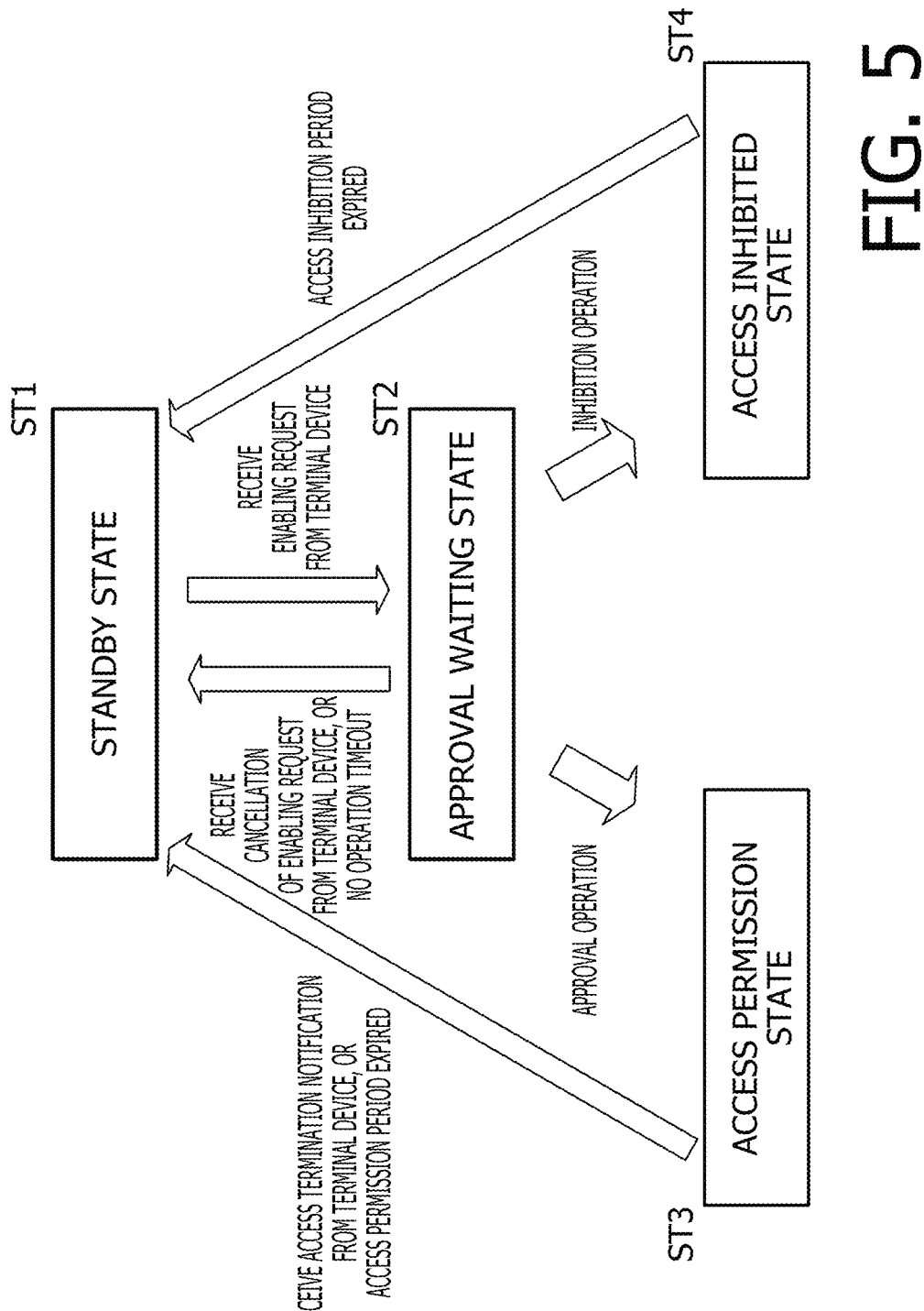
FIG. 5 is a schematic diagram showing a transition of a state of the MFP during the setup of the cloud cooperation function.
Figure 6:
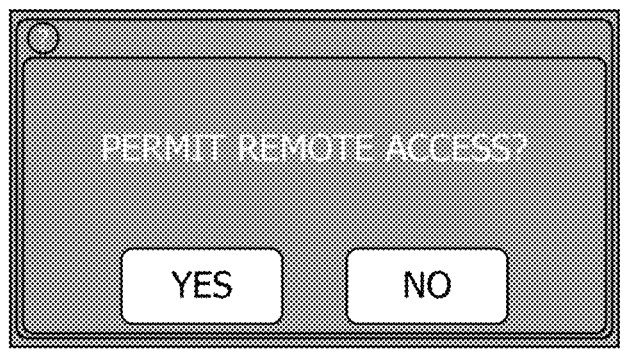
FIG. 6 is a schematic diagram of an approval screen displayed on an LCD module of the MFP during the setup of the cloud cooperation function.

If no other user is using the MFP 10, the controller 8 of the MFP 10 creates a device access token (CS2: Device access token creation process). In this embodiment, the device access token is information including a particular number of digits of random and unique character string created by the controller 8 each time a request for creating the device access token is received. The device access token is "unapproved" in the initial state and is considered "approved" after the approval operation, as described below. When the MFP 10 receives a request to create a device access token (the enabling request), the MFP 10 shifts its state from a standby state ST1 to an approval waiting state ST2, as shown in FIG. 5 (CS3). Whichever state the MFP 10 is in, as shown in FIG. 5, is stored in the RAM 83. The MFP 10, which has shifted its state to the approval waiting state ST2, displays a screen on the LCD module 19 that prompts the user to perform an approval operation to approve the enabling request for a particular period of time (notification process). For example, as shown in FIG. 6, the MFP 10 displays a text message "PERMIT REMOTE ACCESS?" and "Yes" and "No" buttons.

The created device access token is temporarily stored in the RAM 83 of the controller 8 and is further transmitted to the mobile terminal 140 as unapproved (CS4: Device access token transmission process). The mobile terminal 140 temporarily stores the received device access token in the ROM 142. The display 144 of the mobile terminal 140 then displays the screen shown in FIG. 4C. This screen shown in FIG. 4C includes a text message that prompts the user to perform an approval operation on the screen of the MFP and a cancel button.

When the user taps the "Yes" button displayed on the LCD module 19 of the MFP 10 (AS3), the controller 8 of the MFP 10 checks that the approval operation is received from the user (confirmation process). Then, the MFP 10 shifts its state from an approval waiting state ST2 to an access permission state ST3, as shown in FIG. 5. The controller 8 changes the state of the device access token temporarily stored in the RAM 83 to the approved state (changing process).

The access permission state ST3 is a state in which access to the MFP 10 is permitted from the mobile terminal 140 in order to continue the setup. Thus, according to the present embodiment, the state of the MFP 10 can only be changed to the access permission state ST3 and the setup can be continued only when the "Yes" button displayed on the LCD module 19 of the MFP 10 can be tapped after the enabling request. Since a user in a distant location cannot operate the MFP 10, unauthorized access by a malicious third party in a distant location can be prevented and security can be ensured. In addition, since the complicated operation of logging in with an administrator ID and password, which was necessary in the conventional EWS-based technology, is no longer necessary, highly convenient for the user.

After receiving the device access token, the mobile terminal 140 performs a periodic query (polling) of the state of the MFP 10 based on the HTTPS protocol (BS3) until the state of the MFP 10 shifts from the approval waiting state ST2 to the access permission state ST3. This query includes the device access token as identification information of the mobile terminal 140 that transmitted the enabling request.

When the MFP 10 receives the query, the MFP 10 collates the device access token pertaining to the received query with the device access token temporarily stored in the RAM 83. When it is determined in this collation that the device access token is appropriate and it is further confirmed that the device access token has been approved, i.e., the "Yes" button has been tapped and the device has been shifted to the access permission state ST3, the MFP 10 transmits information that the device access token has been shifted to the access permission state ST3 to the mobile terminal 140 (CS5). Then, the screen shown in FIG. 4D is displayed on the display 144 of the mobile terminal 140. This screen includes a text message "Currently setting up: please wait for a while."

The access permission state ST3 shifts to the standby state ST1 when a particular access permission period ends or when an access termination notification transmitted from the mobile terminal 140 according to a user operation is received.

On the other hand, when the user taps the "No" button displayed on the LCD module 19 of the MFP 10 (an inhibition operation), the state of the MFP 10 shifts from the approval waiting state ST2 to an access inhibited state ST4, as shown in FIG. 5. In this embodiment, any operation other than tapping of the "Yes" button (e.g., depressing the stop key) may be treated as an inhibition operation. When it is confirmed that the "No" button has been tapped and the state of the MFP 10 has shifted to the access inhibited state ST4 in response to the polling of the state of the MFP 10 from the mobile terminal 140, information that the state of the MFP 10 has shifted to the access inhibited state ST4 is sent to the mobile terminal 140. Then, a screen shown in FIG. 4E is displayed on the display 144 of the mobile terminal 140. This screen includes a text message "Setup failed: not approved by the device" and a "back" button.

As will be described later, the MFP 10 does not execute the notification process and the confirmation process during the period of time in which the MFP 10 is in the access inhibited state ST4, even if there is a new enabling request. As shown in FIG. 5, the state of the MFP 10 returns to the standby state ST1 after a particular period of time has elapsed after the state of the MFP 10 has shifted to the access inhibited state ST4.

Also in a case where no approval operation is performed within a particular period of time after the screen shown in FIG. 6 is displayed on the LCD module 19 of the MFP 10 (no operation timeout), the screen shown in FIG. 4E is displayed, but the state of the MFP 10 returns to the standby state ST1. Also in the case where a signal to cancel the enabling request is received from the mobile terminal 140 in the approval waiting state ST2, the state of the MFP 10 returns to the standby state ST1.

After receiving information indicating that the state of the MFP 10 has shifted to the access permission state ST3, the mobile terminal 140 transmits, to the MFP 10, a request to initiate a constant connection with the server 160 based on the HTTPS protocol (BS4). This constant connection initiation request includes the device access token, and when the MFP 10 confirms that the collation of the device access token related to the constant connection initiation request as received with the device access token temporarily stored in the RAM 83 has been successfully performed, the MFP 10 transmits a signal to the mobile terminal 140 indicating a successful completion of the collation (CS6). Then, when the MFP 10 is not in constant connection with the server 160 at this point, the constant connection based on an XMPP (Extensible Messaging and Presence Protocol) over BOSH (Bidirectional-streams Over Synchronous (HTTP) is initiated with the server 160 (constant connection establishment process). Once the constant connection is established, even if the power of the MFP 10 is turned off, the constant connection is established as soon as the power is turned on again. When the MFP 10 confirms that the collation of the received device access token was not successfully completed, the MFP 10 transmits a signal indicating a collation error to the mobile terminal 140.

The mobile terminal 140, which has received the signal indicating the normal completion of collation, makes a periodic query (polling) to the MFP 10 to obtain a server connection state, based on the HTTPS protocol (BS5). This query includes a device access token as identification information of the mobile terminal 140 that transmitted the enabling request. When the MFP 10 receives the query, the MFP 10 collates the device access token pertaining to the received query with the device access token temporarily stored in the RAM 83. When it is determined in this collation that the device access token is appropriate, and furthermore, it is confirmed that the constant connection with the server 160 has been changed from "not connected" to "connected," information indicating the change of the connection state is transmitted to the mobile terminal 140 (CS7).

As described above, a process R1 from BS4 to CS7 is not performed when the constant connection between the MFP 10 and the server 160 has already been established at the time when the mobile terminal 140 makes the enabling request of the cloud cooperation function.

Next, the mobile terminal 140, which receives information that the constant connection state is "connected," transmits a request to create a server access token to the MFP 10 based on the HTTPS protocol (BS6), and the MFP 10 receives the request (device access token reception process). The request to create the device access token includes the device access token and information about the type of the app. The process here is performed as an asynchronous process, as the connection with the server 160 may take some time. The MFP 10, which receives the request to create the server access token, collates the device access token pertaining to the received creation request with the device access token temporarily stored in the RAM 83 (collation process). When this collation determines that the device access token is appropriate, the MFP 10 issues a reception ID (information containing a particular number of digits of random and unique character string created each time) (CS8: Issuance process) and temporarily stores the reception ID in the RAM 83. The reception ID is then transmitted to the mobile terminal 140 (CS9: Authentication information transmission process). When the MFP 10 confirms that the received device access token was not successfully collated, the MFP 10 transmits a signal indicating a collation error to the mobile terminal 140.

After creating the reception ID, the MFP 10 transmits a request to create a server access token to the server 160 based on the HTTPS protocol (CS10: Token creation request processing). The creation request includes a device ID (e.g., a MAC address of the MFP or a unique product serial number for the individual MFP) and information on the type of app. The token creator 161*a* of the server 160, which receives the request to create the server access token, creates the server access token (DS1). In this embodiment, the server access token is information including a particular number of digits of random and unique character string created by the token creation unit 161*a* each time the request to create the server access token is received. In this embodiment, the server access token created by the server has an expiration date. The created server access token is stored in the token storage 162*a* in association with the device ID and app type information along with the information indicating the expiration date, and is further transmitted to the MFP 10 along with the information indicating the expiration date, the device ID, and the app type information (DS2). Then, the MFP 10 receives the token (Server access token reception process). The MFP 10 temporarily stores the received server access token and other information in the RAM 83 (CS11).

After receiving the reception ID, the mobile terminal 140 makes a periodic query (polling) to the MFP 10 for the reception of the server access token, based on the HTTPS protocol (BS7). This query includes the reception ID. In response to the query, the MFP 10 collates the received reception ID with the reception ID temporarily stored in the RAM 83 (CS12). After confirming that the collation has been successfully performed, the server access token, information indicating the expiration date, the device ID, and the app type information are sent to the mobile terminal 140 (CS13: Server access token transmission process). The mobile terminal 140 stores the received server access token and the like in the EEPROM 143. In this embodiment, the MFP 10 transmits the server access token, etc. received from the server 160 as is (without processing anything) to the mobile terminal 140. After that, the MFP 10 deletes the reception ID and server access token, etc. temporarily stored in the RAM 83 (CS 14).

A process R2 from BS6 to CS14 is performed only once for a single mobile device, for each combination of mobile device app type and image processing device, within a validity period (i.e., before the expiration date) of the server access token.

After receiving the server access token, the mobile terminal 140 transmits a deletion request to delete the device access token to the MFP 10 (BS8). The deletion request includes the device access token. When the MFP 10 confirms that the collation of the device access token pertaining to the received deletion request with the device access token temporarily stored in the RAM 83 has been successfully performed, the MFP 10 deletes the device access token temporarily stored in the RAM 83 (CS15). Then, the information that the deletion was successful is transmitted to the mobile terminal 140 (CS16).

At this time, the display 144 of the mobile device displays the screen shown in FIG. 4F. This screen includes a statement that the setup of the cloud cooperation function is completed and a list of functions that can be used with the cloud cooperation function, and a button to return to the menu. When some error occurs after the screen shown in FIG. 4D has been displayed and setup was not possible, the screen shown in FIG. 4G is displayed. This screen includes a text message stating that the setup of the cloud cooperation function has failed, and a button for advanced settings. A cause of the error may be that the MFP 10 was unable to connect to the Internet, or that the proxy server and/or DNS server of the MFP 10 has been misconfigured (e.g., setups have been failed). When the advanced settings button is tapped, a browser app is launched and a web page provided by the EWS of the MFP 10 is automatically displayed. The user can set up the cloud cooperation function after entering the ID and password in the input fields of the screen displayed based on the EWS.

In addition to the timing when the mobile terminal 140 has received the server access token, the deletion of the device access token from the MFP 10 can be done when a state of the MFP 10 in the approval waiting state ST2, the access permission state ST3 (except when the mobile terminal 140 has received the server access token) or the access inhibited state ST4 returns to the standby state ST1.

The mobile terminal 140 can, at any point in time, inquire of the MFP 10 whether the current state is the waiting state ST1, the approval waiting state ST2, the access permitted state ST3, or the access inhibited state ST4. Upon receiving the inquiry, the MFP 10 transmits information indicating the current state to the mobile terminal 140.

Figure 7:
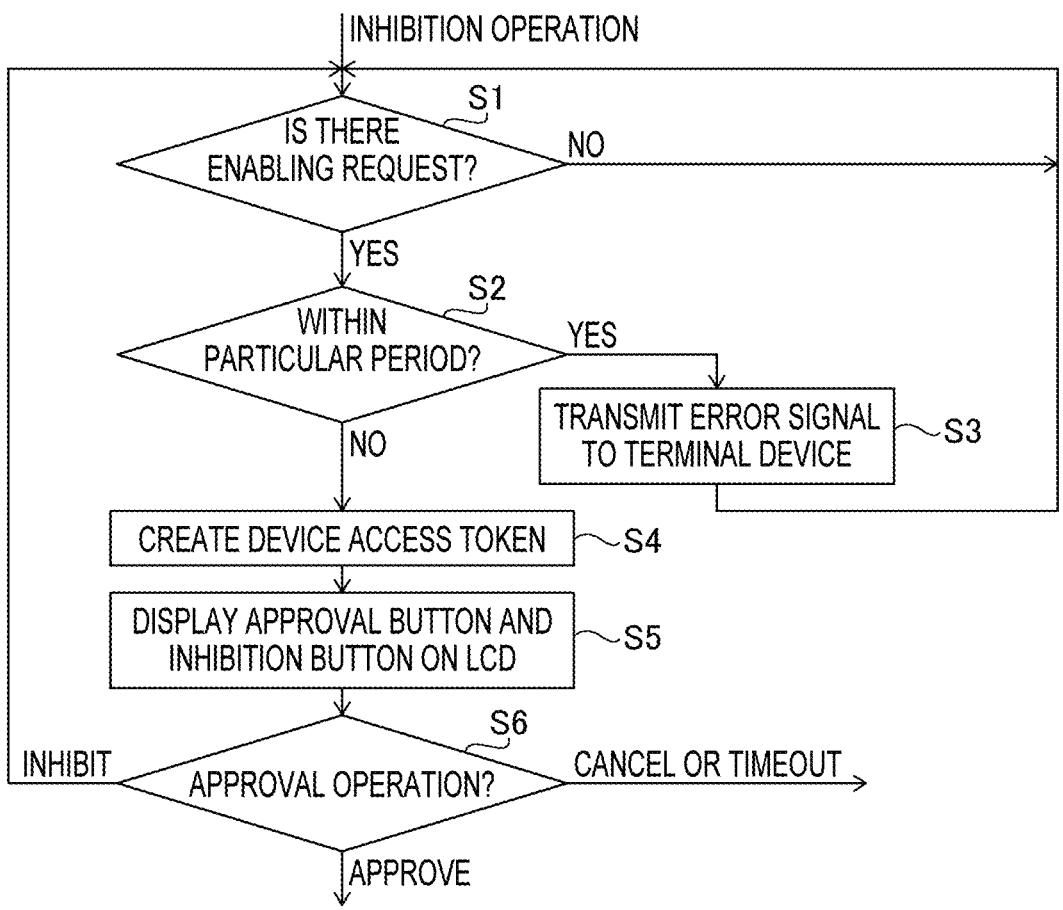
FIG. 7 is a flowchart illustrating an operation of an MFP when an inhibiting operation is performed on the approval screen shown in FIG. 6.

Next, the operation of the MFP 10 when the inhibition operation is performed in the approval waiting state ST2 will be described with reference to FIG. 7.

First, it is determined whether a new enabling request is received after the state of the MFP 10 is shifted from the approval waiting state ST2 to the access inhibited state ST4 by the inhibition operation (S1). When it is determined that the enabling request has been received (S1: YES), it is determined, in S2, whether the enabling request was received within a particular period of time after the inhibition operation was confirmed. When it is determined that the enabling request was received within the particular period (S2: YES), the MFP 10 transmits an error signal indicating that the setup cannot be continued to the mobile terminal 140 (S3). Then, the MFP 10 causes the mobile terminal 140 to display, on the display 144 of the mobile terminal 140, a text message such as "Setup cannot be performed for now. Please try again after a while." or the like.

When it is determined that the enabling request has been received not within a particular period of time, i.e., after the particular period of time has elapsed since the inhibition operation was confirmed (S2: YES), the MFP 10 creates a device access token in the same manner as in CS2 (S4). Then, as in CS3, the state of the MFP 10 shifts from the standby state ST1 to the approval waiting state ST2, and the MFP 10 displays a screen (as in FIG. 6) on the LCD module 19 that prompts the user to perform the approval operation (S5).

Figure 3:
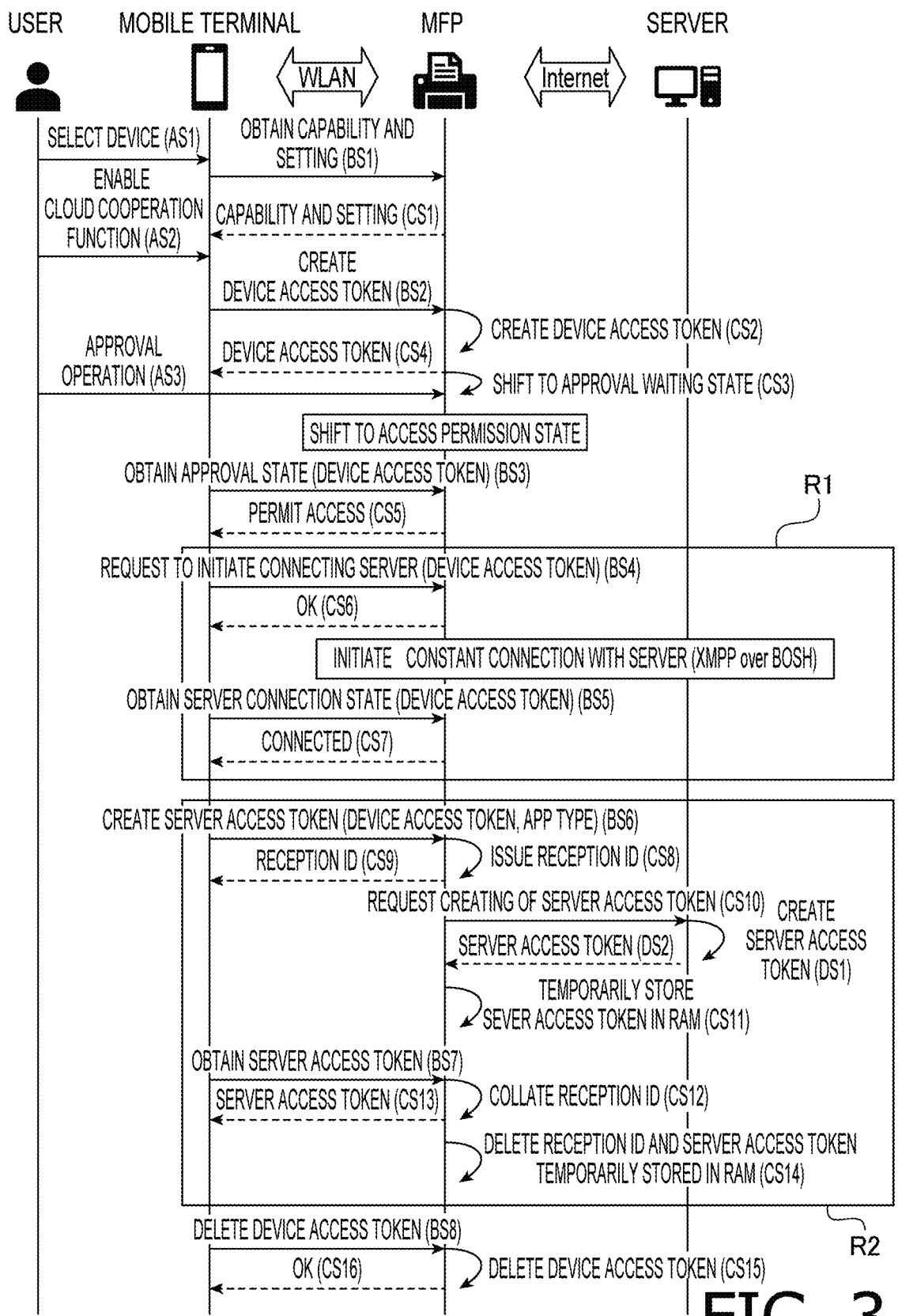
FIG. 3 is a setup sequence diagram of a cloud cooperation function in an image processing system including the MFP shown in FIG. 1.

When the user taps the "Yes" button displayed on the LCD module 19 of the MFP 10 (S6: Approval), the process CS5 onwards in FIG. 3 are performed. When the user taps the "No" button (S6: Inhibited), the MFP 10 returns to S1 and repeats the same processes described above. When the no operation timeout is reached or an enabling cancellation signal is received from the mobile terminal 140, the MFP 10 returns to the standby state.

Figure 8:
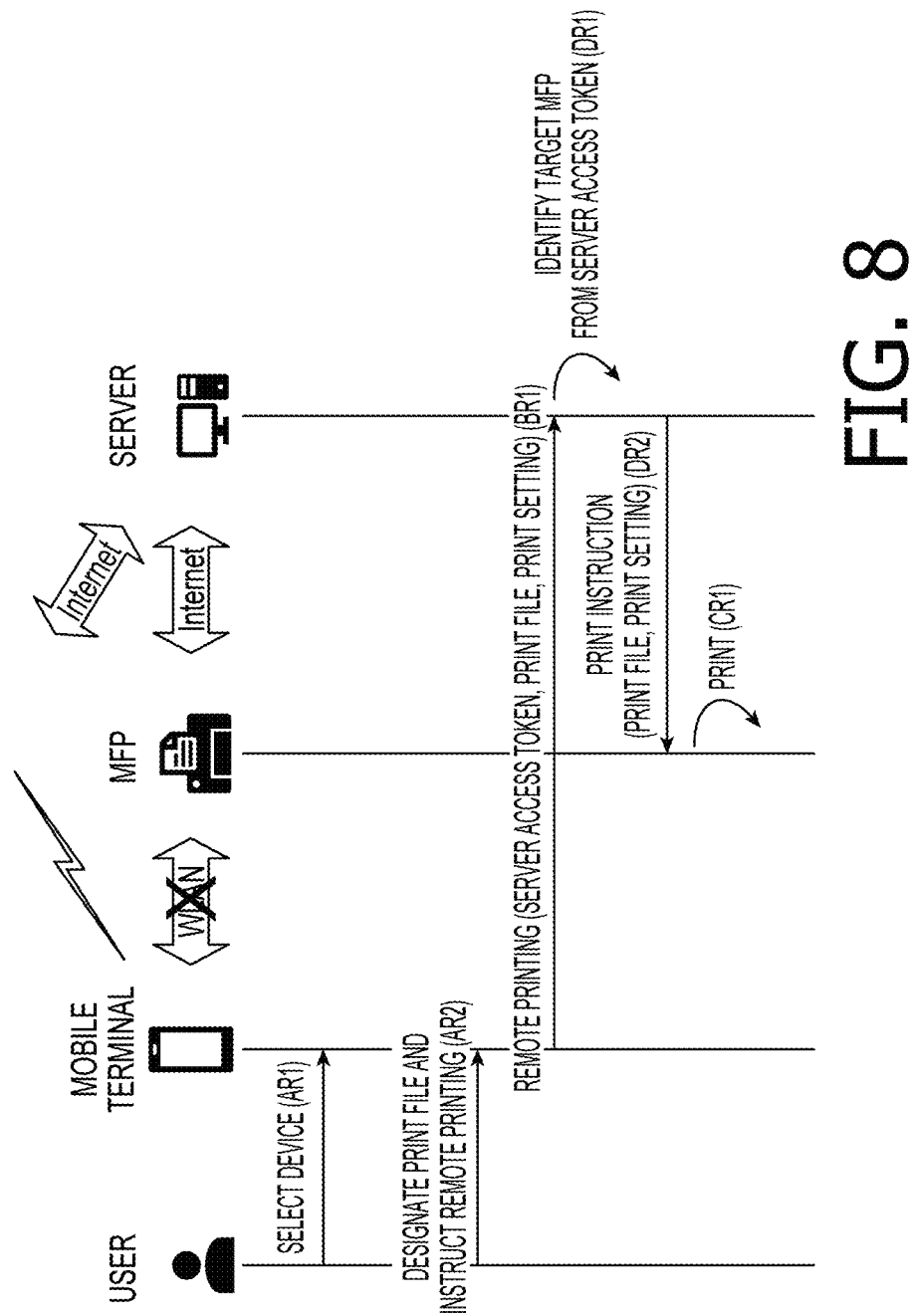
FIG. 8 is a sequence diagram of remote printing in an image processing system including the MFP shown in FIG. 1.

Next, a remote access to the MFP 10 using the cloud cooperation function performed after the completion of setup will be described with reference to FIG. 8, using a remote printing as an example. In the present embodiment, the remote printing is defined as a printing performed as a print command is supplied from the mobile terminal 140 to the MFP 10 via the server 160 when the mobile terminal 140 and the MFP 10 are not in the same network, and the mobile terminal 140 is connected to the Internet via the mobile communication module 147.

First, the user launches the MFP management app on the mobile device 140 and then performs the particular operations to the app by tapping on the display 144 to cause the display 144 to display a list of one or more devices (e.g., MFPs, printers, scanners, etc.) of which the cloud cooperation function is set up by the mobile terminal 140 using the app (i.e., which receive the server access tokens). In the present embodiment, only the devices of which expiration dates of the server access tokens are within the effective period are displayed in this list. This is achieved by storing the server access tokens received in CS13 in association with expiration dates, the device IDs, and app type information in EEPROM 143. The user then selects the desired device for remote printing from among these devices by tapping the display 144 (AR1). The explanation will now proceed, assuming that the device selected here is the MFP 10 of FIG. 1. Alternatively, all the devices may be displayed in the list, and whether the server access token pertaining to the selected device is within the expiration date may be determined by the server receiving the remote printing instruction BR1, which is described below.

The user then performs a particular operation on the app by tapping the display 144 to designate a target print file, which is to be used in the printing to be performed on the selected MFP 10. Further, the user inputs the setting information (e.g., image quality, the number of sheets, etc.), and finally performs the remote print instruction operation (AR2). The print file designated in the present embodiment will be described as being stored in the EEPROM 143 of the mobile terminal 140, but the print file may be stored in the server 160, or the print file may be stored elsewhere. Then, the mobile terminal 140 instructs the server 160 to perform the remote printing to the server 160 via the mobile communication module 147 based on the HTTPS protocol (BR1). This remote printing instruction includes the server access token, a print file, and setting information. It is noted that the access information transmitted from the mobile device 140 to the server 160 may be stored in the app from the beginning or included in the server access token.

When the server 160 receives the remote print instruction, the received server access token, the print file, and the setting information are stored in a temporary data storage 162b. The token collator 161b of the server 160 collates the server access token included in the received remote print instruction with the server access token stored in the token storage 162a. When the collation is successfully performed, the MFP 10 that is to perform the printing is identified based on the device ID, stored in the token storage 162a, in association with the server access token (DR1).

The server 160 then transmits the print file and the setting information to the identified MFP 10 via the Internet (DR2). Upon receiving the information, the MFP 10 performs printing using the print file based on the setting information (CR1).

In the present embodiment described above, when the MFP 10 receives the approval operation after the mobile terminal 140 transmits the enabling request to the MFP 10, the mobile terminal 140 can receive the server access token created by the server 160. Then, the mobile terminal 140 can transmit a remote print instruction to the server 160 by sending the server access token. The mobile terminal 140 only needs to perform an approval operation to the MFP 10 to receive the server access token, eliminating need for complicated operations such as entering identification information and a password, and increasing the convenience for the user in preparing to use the cloud cooperation function. In addition, when the MFP 10 requests the server 160 to create the server access token, it is required to operate the approval operation on the display 144 that can only be performed by an operator in the vicinity of the MFP 10, thus ensuring security.

In the present embodiment, the MFP 10 that receives the enabling request creates a device access token containing a unique character string. In addition to the above approval operation, after determining that the device access token received in the device access token reception process is appropriate in the collation process, the server access token creation request is transmitted to the server 160, thus ensuring a higher level of security.

Furthermore, in the present embodiment, when the enabling request receiving process is performed, the device access token is created and transmitted to the mobile terminal 140 before the approval operation is received, so that, compared to creating the device access token and transmitting it to the mobile terminal 140 after the display 144 receives the approval operation, the processing can be performed quickly.

In the present embodiment, in CS8, the reception ID is issued and transmitted to the mobile terminal 140, and the server access token is transmitted only to the mobile terminal 140 that has transmitted a obtaining request of the server access token including the reception ID, thus ensuring a higher security.

In addition, in the present embodiment, the server access token includes information about the type of the app, so that the server can properly manage the server access token for each app.

In the present embodiment, if the server 160 and the MFP 10 are not always connected when it is confirmed in the confirmation process that the approval operation of the enabling request has been performed, the constant connection establishment process is performed to establish the constant connection between the server 160 and the MFP 10 before performing the token creation request process (CS10). It is noted that establishing the constant connection in this way is useful when a push transmission from the server 160 to the MFP 10 is not available.

In the present embodiment, when the "Yes" button displayed on the LCD module 19 is tapped, the CPU 81 checks in the confirmation process that the approval operation is accepted by the LCD module 19. Thus, in the present embodiment, the confirmation process is performed with a simple button operation without requiring the user to perform complicated operations, thus the operational burden on the user can be reduced.

Furthermore, in the present embodiment, within a particular period of time after the inhibition operation is confirmed by the confirmation process, the notification process and the confirmation process are not executed, even if an enabling request is received from the terminal. Therefore, a situation in which the operation of the MFP is stopped by an external attack can be avoided.

Modification

Figure 9:
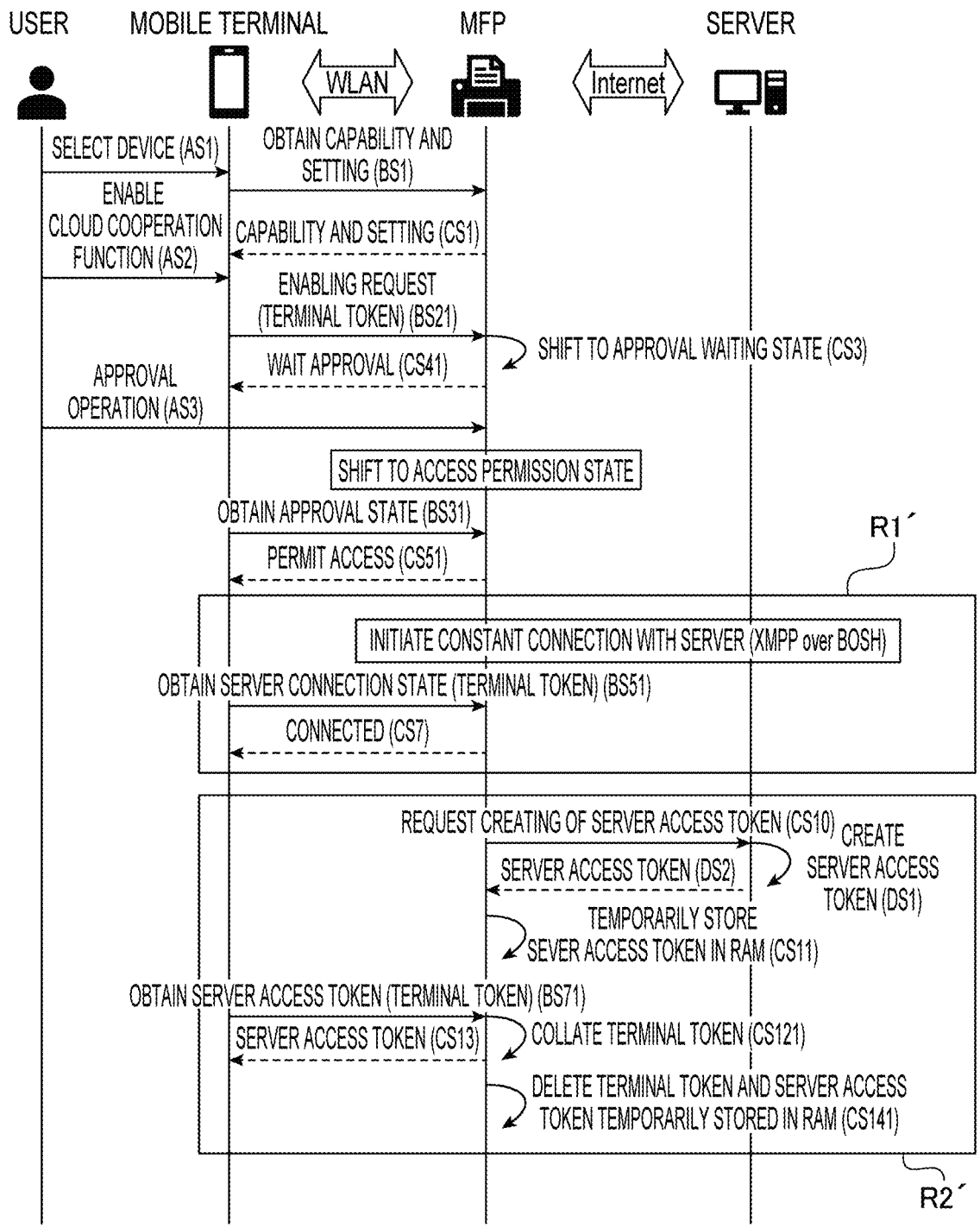
FIG. 9 is a setup sequence diagram of the cloud cooperation function in the image processing system in a modification.

Next, one modification of the above-described embodiment will be described with reference to FIG. 9. In this modification, the device access token is not created in the setup of the cloud cooperation function, but instead a terminal token, which is authentication information created by the terminal, is used. In FIG. 9, the same steps as described in FIG. 3 may be given the same symbols and the explanation may be omitted.

First, from the list displayed on the display 144, the user selects a desired device to be targeted for the cloud cooperation function (AS1). The description will now proceed, assuming that the selected device is the MFP 10 of FIG. 1. Then, the mobile terminal 140 obtains capability and configuration information of the MFP 10 (BS1, CS1).

When the user taps the enabling button for the cloud cooperation function displayed on the display 144 of the mobile terminal 140 (AS2), the mobile terminal 140 transmits the enabling request to the MFP 10 (BS21), and the MFP receives the enabling request (enabling request receiving process). The enabling request includes a terminal token of the mobile terminal 140 and information that the access type is the cloud cooperation function. The enabling request the MFP 10 received is temporarily stored in the RAM 83 of the controller 8. The terminal token is information including a particular number of digits of random and unique character string created by the mobile terminal 140 each time the mobile terminal 140 receives the user's tap of the enabling button. In this modification, the description of a case where the setup fails is omitted.

When the MFP 10 receives the enabling request, the state of the MFP 10 shifts from the standby state ST1 to the approval waiting state ST2 as shown in FIG. 5 (CS3). The MFP 10, of which the state has shifted to the approval waiting state ST2, displays a screen on the LCD module 19 that prompts the user to perform an approval operation to approve the enabling request for a particular period of time (notification process). Concretely, as shown in FIG. 6, a text message saying "PERMIT REMOTE ACCESS?" and the "Yes" and "No" buttons are displayed. Further, the mobile terminal 140 is notified that the state of the MFP 10 has shifted to the approval waiting state ST2 (CS41).

When the user taps the "Yes" button displayed on the LCD module 19 of the MFP 10 (AS3), the controller 8 of the MFP 10 confirms that the user's approval operation has accepted (confirmation process). Then, the state of the MFP 10 shifts from the approval waiting state ST2 to the access permission state ST3, as shown in FIG. 5. Thus, in this modification, the state of the MFP 10 shifts to the access permission state ST3 only when the "Yes" button has been tapped, and the setup can be continued. Since a user in a distant location cannot operate the MFP 10, unauthorized access by a malicious third party in a distant location can be prevented and security can be ensured.

After the mobile terminal 140 is notified that the state of the MFP 10 has shifted to the approval waiting state ST2, the mobile terminal 140 performs a periodic query (polling) of the state of the MFP 10 based on the HTTPS protocol until the state of the MFP 10 shifts from the approval waiting state ST2 to the access allowed state ST3 (BS31). This query includes the terminal token of the mobile terminal 140 that transmitted the enabling request.

When the MFP 10 receives the query described above, the MFP 10 collates the terminal token pertaining to the received query with the terminal token temporarily stored in the RAM 83. When it is determined in this collation that the authentication information is appropriate, and it is further confirmed that the authentication operation has been performed, i.e., the "Yes" button has been tapped and the state of the MFP 10 has shifted to the access permission state ST3, the MFP 10 transmits information to the mobile terminal 140 that the state of the MFP 10 has shifted to the access permission state ST3 (CS51).

When the state of the MFP 10 shifts to the access permission state ST3, the MFP 10 starts the constant connection with the server 160 if the constant connection with the server 160 has not been established at this point (constant connection establishment process).

The mobile terminal 140, which receives information that the state of the MFP 10 has shifted to the access permission state ST3, makes a periodic query (polling) to the MFP 10 to obtain the server connection state (BS51). This query includes the terminal token of the mobile terminal 140 that transmitted the enabling request. When the MFP 10 receives the query, the MFP 10 collates the terminal token pertaining to the received query with the terminal token temporarily stored in the RAM 83. When it is determined in this collation that the terminal token is appropriate, and further that the constant connection state with the server 160 has been changed from "not connected" to "connected," the information indicating that the connection state of the MFP 10 with the server 160 has been changed from "not connected" to "connected" is transmitted to the mobile terminal 140 (CS7).

As described above, the process R1' from the constant connection initiation step to CS7 is not performed when the mobile terminal 140 has already established the constant connection with the MFP 10 and the server 160 at the time when the mobile terminal 140 makes the enabling request of the cloud cooperation function.

Once the constant connection is established, the MFP 10 transmits the request to create the server access token to the server 160, based on the HTTPS protocol (CS10: Token creation request process). The server 160 then creates the server access token (DS1), which is transmitted to the MFP 10 (DS2), and the MFP 10 receives the same (server access token receiving process). The MFP 10 temporarily stores the received server access token in the RAM 83 (CS11).

The mobile terminal 140, which has received the information that the constant connection state has been changed to "connected," makes a periodic query (polling) to the MFP 10 for obtaining the server access token, based on the HTTPS protocol (BS71). This query includes the terminal token. In response to the query, the MFP 10 collates the received terminal token with the terminal token temporarily stored in the RAM 83 (CS121). After confirming that the collation has been successfully performed, the server access token, information indicating the expiration date, the device ID, and the app type information are transmitted to the mobile terminal 140 (CS13: server access token transmission process). The mobile terminal 140 stores the received server access token and other information in the EEPROM 143. After that, the MFP 10 deletes the terminal tokens and server access tokens, etc. temporarily stored in the RAM 83 (CS141).

The process R2' from CS10 to CS141 is performed only once within the effective period (i.e., before the expiration period) of the server access token for each combination of app type of the mobile device and the image processing apparatus, for one mobile device.

Thus, in this modification, security can be ensured because it is guaranteed that the server access token is transmitted only to a mobile terminal that has transmitted the request to obtain the server access token including the terminal token that is the authentication information of the mobile terminal 140. In addition, a time required to create and transmit the device access token can be reduced since the device access token does not need to be created.

Another Modification

Next, another modification of the above-described embodiment will be described with reference to FIG. 10. In this modification, the MFP does not have the LCD module 19, but instead has a plurality of physical buttons as a receiving device and an LED lamp as a notification device. In the following description, parts the same as the above-described embodiment will be omitted, while parts different therefrom will be described mainly.

Figure 10:
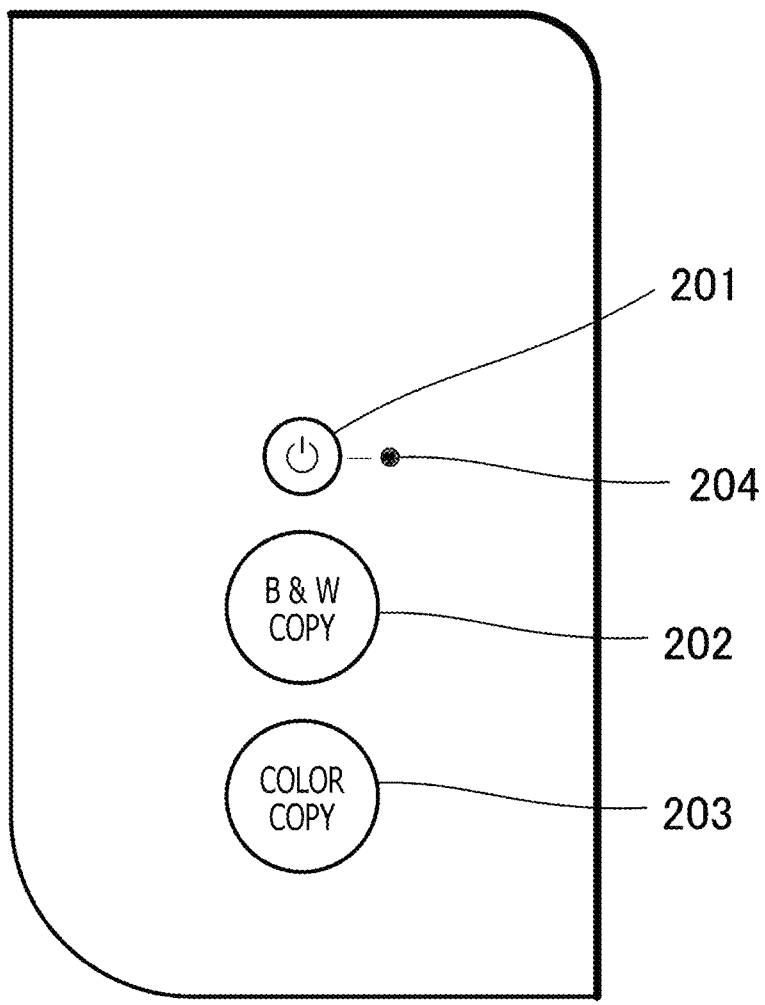
FIG. 10 is a partially enlarged view of a surface of a housing of the MFP according to another modification.

As shown in FIG. 10, a power button 201, a black-and-white copy button 202, a color copy button 203, and an LED lamp 204 are arranged on a surface of the housing of the MFP according to the present modification. The power button 201, the black-and-white copy button 202 and the color copy button 203 are switches each having a mechanical structure configured to output an electrical signal indicating its state as the physical state of the button, such as its position, changes when operated by an operator.

By depressing the power button 201, the power of the MFP can be switched from on to off or from off to on. By depressing the black-and-white copy button 202, a document placed on the flatbed (not shown) of the scanning module 18 can be read to create image data, and the print module 6 can operate the print module 6 to form an image on sheet based on the created image data to create a black-and-white copy of the document. Similarly, by depressing the color copy button 203, a color copy of the document can be made, and the LED lamp 204 informs the user of the state of the MFP by its lighting pattern.

In the present modification, when the state of the MFP shifts to the approval waiting state ST2 (CS3), the MFP flashes the LED lamp 204 in a particular pattern for a particular period of time. This flashing pattern is meant to prompt the user to perform a particular approval operation (concretely, pressing the two buttons 202 and 203 simultaneously) to approve the enabling request. When the user simultaneously presses the black-and-white copy button 202 and the color copy button 203, the MFP confirms that the approval operation is received and shifts its state to the access authorization state ST3. Thereafter, the same process as described in the above-described embodiment is performed.

According to the present modification, it is confirmed that the approval operation is received when there is a special button operation, such as a simultaneous pressing of two buttons 202 and 203, which is not performed in the normal operation of the MFP. Therefore, there is no need to provide a separate button for the reception operation and the number of mechanical buttons can be reduced.

In this modification, the mobile terminal 140 receiving the device access token may display a screen on the display 144 that prompts the user to press the two buttons 202 and 203 of the MFP 10 simultaneously.

Further Modifications

Next, further modifications of the above-described embodiment will be described.

After the approval operation, the MFP 10 may create a device access token and transmit the same to the mobile terminal 140, or the MFP 10 may create the device access token before the approval operation and transmit the same to the mobile terminal 140 after the approval operation.

The device access token and terminal token may not be used. Although any identification information may be used for the token, for security purposes, it is preferable that the token is a random character string issued each time.

Although the cloud cooperation function was described in the above embodiment using remote printing as an example, the cloud cooperation function according to aspects of the present disclosures can be any operation related to the image processing device that the mobile terminal performs on the server. For example, the operation may be a trigger for a reading operation performed by the reading module, access to image data sent from the scanner to the server to receive the image data, or various settings related to the device.

The receiving section may be a physical button, a touch panel, or a contactless communication interface such as a Near Field Communication (NFC) card.

The server access token does not need to have an expiration date.

The mobile terminal may have no mobile communication module, but only a wireless LAN module.

In the above-described embodiment, it is confirmed that the approval operation is performed by simultaneously depressing two buttons, each having a mechanical structure. However, it may be confirmed that the approval operation is performed when an operation other than the above is performed on a button having a mechanical structure. For example, a case in which a button is depressed continuously for a particular amount of time or more, or a case in which a button is depressed two or more particular times within a particular amount of time is applicable.

In the above-described embodiment and modifications, the MFP has devices such as the LCD module or the LED lamp as the notification device. According to a modification, the image processing apparatus may have a sound creating device such as a buzzer or speaker as the notification device, instead of the LCD module or the LED lamp.

The image processing apparatus according to aspects of the present disclosures may have a notification device configured to output a notification signal that causes the mobile terminal to perform notification to the mobile terminal. In that case, for example, the notification device may display on the display of the mobile terminal an operation method of the MFP for performing the approval operation, or may output a message from the speaker of the mobile terminal to prompt the user to perform the approval operation.

In the above-described embodiment, an ink-jet type image processing apparatus configured to record an image with ink ejected from nozzles is described as an example. However, the present invention can also be applied to an image processing apparatus having a recording device of a recording type other than an ink-jet type, such as an electrophotographic type, for example.

Although suitable embodiment and modifications according to aspects of the present disclosures have been described above, aspects of the present disclosures are not limited to the above embodiment and modifications, and various design changes can be made to the above embodiment and modifications as far as the claims are concerned.

What is claimed is:

1. An image processing apparatus, comprising:
    at least one of a recording device configured to record an image on a medium or a scanning device configured to scan an image on a medium;
    a communication device;
    a receiving device configured to receive an input according to a user operation;
    a notification device; and
    a controller,
    wherein the controller is configured to perform:
        an enabling request receiving process of receiving an enabling request, which is a request of enabling a terminal device to perform an operation related to the image processing apparatus to a server communicable with the image processing apparatus, from the terminal device via the communication device the operation related to the image processing apparatus being an instruction to the image processing apparatus to perform an image processing using the at least one of the recording device or the scanning device;
        a notification process of controlling the notification device to notify after the enabling request receiving process;
        a confirmation process of checking whether the receiving device receives an approval operation to approve the enabling request after the notification process;
        a token creation requesting process of transmitting a creation request of a server access token regarding the operation performed by the terminal device to the server via the communication device after it is confirmed in the confirmation process that the receiving device has received the approval operation;
        a server access token receiving process of receiving the server access token from the server via the communication device after performing the token creation requesting process;
        a server access token transmitting process of transmitting the server access token to the terminal device via the communication device after performing the server access token receiving process; and
        an instruction receiving process of receiving an image processing instruction from the server after performing the server access token transmitting process, the image processing instruction being based on the operation related to the image processing apparatus that has received the server access token transmitted by the server in response to the token creation requesting process.

2. The image processing apparatus according to claim 1, wherein the controller is configured to perform:
   a device access token creating process of creating a device access token related to access from the terminal device to the image processing apparatus after the enabling request receiving process;
   a device access token transmitting process of transmitting the device access token created in the device access token creating process to the terminal device that has transmitted the enabling request via the communication device;
   a device access token reception process of receiving the device access token from the terminal device via the communication device; and
   a collating process of determining whether the device access token received in the device access token reception process is appropriate, and
   wherein the controller performs the token creation requesting process after it is confirmed that the receiving device receives the approval operation in the confirmation process and it is determined that the device access token is appropriate in the collating process.

3. The image processing apparatus according to claim 2, further comprising a storage,
   wherein the controller is further configured to store the device access token created in the device access token creating process in the storage,
   wherein the device access token stored in the storage and transmitted to the terminal device in the device access token transmitting process is not approved, and
   wherein the controller is further configured to perform a changing process of changing a state of the device access token stored in the storage to an approval state when it is confirmed in the confirmation process that the receiving device has received the approval operation.

4. The image processing apparatus according to claim 2, wherein the controller is further configured to perform:
   an issuance process of issuing authentication information related to reception of the device access token received in the device access token reception process; and
   an authentication information transmitting process of transmitting the authentication information issued in the issuance process to the terminal device via the communication device, and
   wherein, the controller performs the server access token transmitting process when receiving an obtaining request for the server access token from the terminal device, the obtaining request including the authentication information.

5. The image processing apparatus according to claim 1, wherein, in a case where the enabling request received from the terminal device in the enabling request reception process includes authentication information, the controller is configured to perform the server access token transmitting process when receiving an obtaining request for the server access token, the obtaining request including the authentication information.

6. The image processing apparatus according to claim 1, wherein the creation request transmitted in the token creation requesting process includes type information of an app executed by the terminal device to perform the operation related to the image processing apparatus, and
   wherein the server access token transmitted to the terminal device in the server access token transmitting process includes the type information of the app.

7. The image processing apparatus according to claim 1, wherein, when a constant connection is not established between the server and the image processing apparatus via the communication device at a time where it is confirmed in the confirmation process that the receiving device has received the approval operation, the controller is configured to perform a constant connection establishing process to establish the constant connection between the server and the image processing apparatus via the communication device.

8. The image processing apparatus according to claim 1, wherein the receiving device includes one or multiple buttons operable by a user,
   wherein the controller is configured to confirm that the receiving device has received the approval operation when at least one of the one or multiple buttons is operated.

9. The image processing apparatus according to claim 8, wherein each of the one or multiple buttons has a mechanical structure,
   wherein the controller is configured to confirm that the approval operation is received when one of:
      one of the one or multiple buttons being continuously depressed for more than a particular time period;
      one of the one or multiple buttons being depressed by twice or more times within a particular time period; and
      two or more of the one or multiple buttons being depressed simultaneously, is detected in the confirmation process.

10. The image processing apparatus according to claim 1, wherein, when it is determined, in the confirmation process, that the receiving device has received an inhibition operation indicating that the enabling request is not approved, the controller performs none of the notification process and the confirmation process for a particular period after confirmation in the confirmation process even though the enabling request is received from the terminal device.

11. An image processing system including an image processing apparatus, a terminal device and a server,
   wherein the image processing apparatus includes at least one of a recording device configured to record an image on a medium or a scanning device configured to scan an image on a medium, a communication device, a receiving device configured to receive an operation by a user, a notification device and a controller,
   wherein the terminal device is configured to transmit an enabling request to enable the terminal device to perform an operation related to the image processing apparatus to the server communicable with the image processing apparatus,
   wherein the controller is configured to perform:
      an enabling request receiving process of receiving the enabling request via the communication device, the operation related to the image processing apparatus being an instruction to the image processing apparatus to perform an image processing using the at least one of the recording device or the scanning device;
      a notification process of controlling the notification device to notify after the enabling request receiving process;

a confirmation process of checking whether the receiving device receives an approval operation to approve the enabling request after the notification process; and a token creation requesting process of transmitting a creation request of a server access token regarding the operation performed by the terminal device to the server via the communication device after it is confirmed in the confirmation process that the receiving device has received the approval operation;

wherein the server is configured to create the server access token and transmit the created server access token to the image processing apparatus in response to receipt of the creation request of the server access token;

wherein the controller is further configured to perform:

a server access token receiving process of receiving the server access token from the server via the communication device after performing the token creation requesting process;

a server access token transmitting process of transmitting the server access token to the terminal device via the communication device after performing the server access token receiving process; and an instruction receiving process of receiving an image processing instruction from the server after performing the server access token transmitting process, the image processing instruction being based on the operation related to the image processing apparatus that has received the server access token transmitted by the server in response to the token creation requesting process; and wherein the terminal device is configured to transmit the server access token and a command including the operation related to the image processing apparatus to the server after receiving the server access token from the image processing apparatus.

12. A non-transitory computer-readable recording medium for an image processing apparatus, the image processing apparatus including at least one of a recording device configured to record an image on a medium or a scanning device configured to scan an image on a medium, a communication device, a receiving device configured to receive an input according to a user operation, a notification device, and a controller, wherein the recording medium containing computer-executable instructions which cause, when executed by the controller, the image processing apparatus to perform:

an enabling request receiving process of receiving an enabling request, which is a request of enabling a terminal device to perform an operation related to the image processing apparatus to a server communicable with the image processing apparatus, from the terminal device via the communication device, the operation related to the image processing apparatus being an instruction to the image processing apparatus to perform an image processing using the at least one of the recording device or the scanning device;

a notification process of controlling the notification device to notify after the enabling request receiving process;

a confirmation process of checking whether the receiving device receives an approval operation to approve the enabling request after the notification process;

a token creation requesting process of transmitting a creation request of a server access token regarding the operation performed by the terminal device to the server via the communication device after it is confirmed in the confirmation process that the receiving device has received the approval operation;

a server access token receiving process of receiving the server access token from the server via the communication device after performing the token creation requesting process;

a server access token transmitting process of transmitting the server access token to the terminal device via the communication device after performing the server access token receiving process; and an instruction receiving process of receiving an image processing instruction from the server after performing the server access token transmitting process, the image processing instruction being based on the operation related to the image processing apparatus that has received the server access token transmitted by the server in response to the token creation requesting process.

* * * * *

UNITED STATES PATENT AND TRADEMARK OFFICE
CERTIFICATE OF CORRECTION

PATENT NO. : 11,729,338 B2
APPLICATION NO. : 17/193326
DATED : August 15, 2023
INVENTOR(S) : Tetsuya Okuno It is certified that error appears in the above-identified patent and that said Letters Patent is hereby corrected as shown below:

In the Claims

Column 18, Claim 1, Line 34 should read:
terminal device via the communication device, the Signed and Sealed this
Twenty-first Day of November, 2023

*Katherine Kelly Vidal*

Katherine Kelly Vidal
*Director of the United States Patent and Trademark Office*